Patented Mar. 2, 1926.

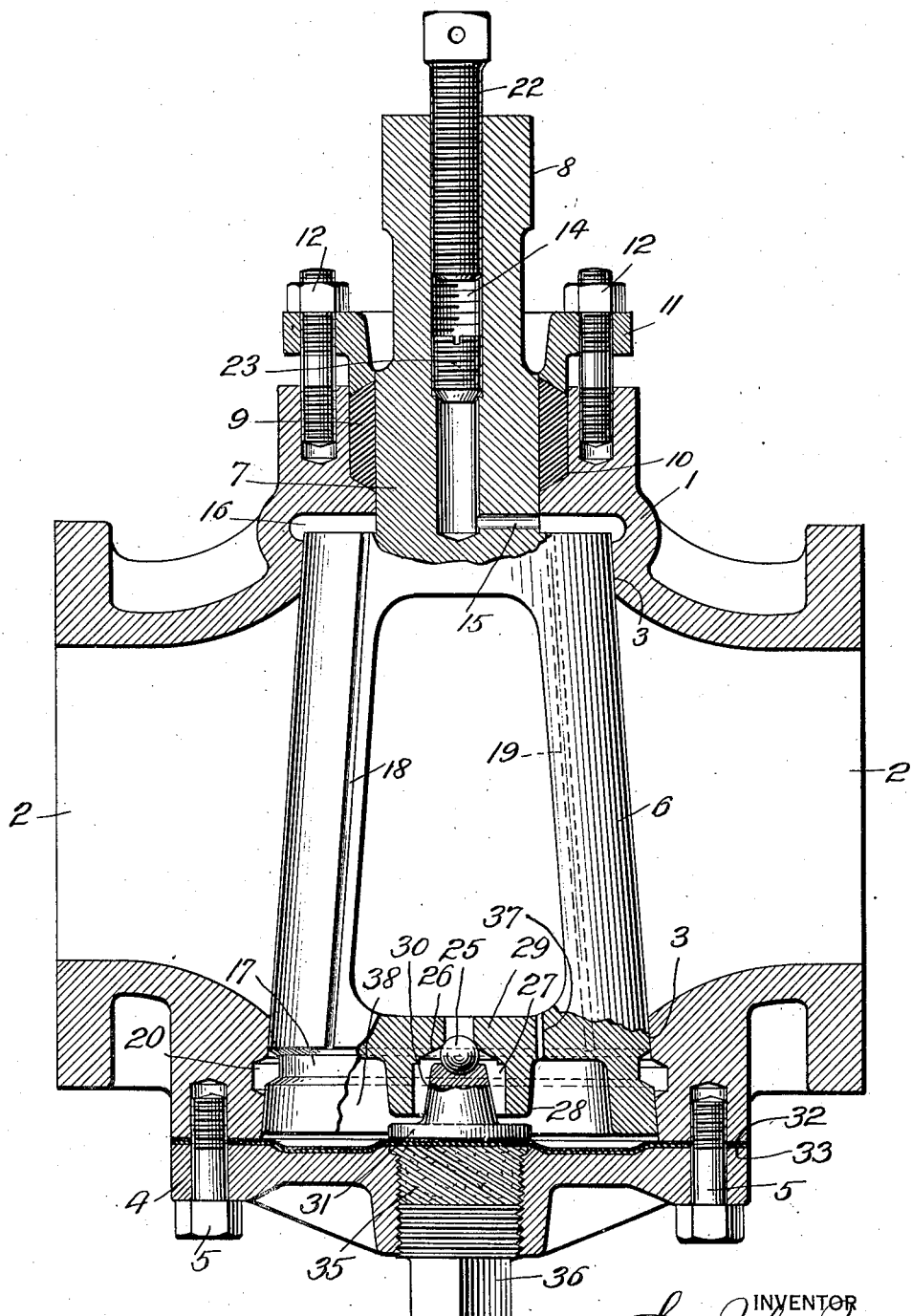

1,574,925

UNITED STATES PATENT OFFICE.

SVEN JOHAN NORDSTROM, OF SARATOGA, CALIFORNIA, ASSIGNOR TO MERCO NORDSTROM VALVE COMPANY, OF SAN FRANCISCO, CALIFORNIA, A CORPORATION OF DELAWARE.

VALVE.

Application filed August 12, 1925. Serial No. 49,697.

*To all whom it may concern:*

Be it known that I, SVEN JOHAN NORDSTROM, a subject of the King of Sweden, and a resident of Saratoga, in the county of Santa Clara and State of California, have invented certain new and useful Improvements in Valves, of which the following is a specification.

The invention relates to plug valves of the type in which a fluid or plastic substance, such as the lubricant for lubricating the valve, is put under pressure for the purpose of lifting the plug from its seat in order that the bearing surfaces between the plug and the valve casing may thereby be properly lubricated.

It is well-known that plug valves which are not provided with means for separating the plug from the valve seat, so that the bearing surfaces between them may be lubricated, are restricted to relatively small sizes because of the difficulty in manipulating and operating the larger size valves. By providing plug valves with means for separating the plug from its seat so that a film of lubricant may be spread over the contacting surfaces, the manipulation or operation of the valves is facilitated, with the result that larger plug valves are now built than was formerly possible. One object of the present invention is to still further increase the size and capacity of plug valves. A further object of the invention is to improve the construction and arrangement of the parts of valves of this type so that these larger size valves may be manipulated relatively easily, that is to say, with the expenditure of but little more force than is required for the manipulation of the valves of smaller sizes. To these ends, improved means are provided for resiliently holding the plug against its seat and an improved lubricating arrangement is provided for lifting the plug from its seat when the valve is to be lubricated. Another object of the invention is the provision of improved means for protecting the resilient plug-holding means from the corrosive and deteriorating action of the fluids passing through the line controlled by the valve. To the accomplishment of these objects the invention consists in the improved plug valve hereinafter described and particularly pointed out in the appended claims.

The preferred form of the invention is illustrated in the accompanying drawing which is a vertical section of the improved valve. The valve, as illustrated, comprises a casing 1 provided with a longitudinal passageway 2 therethrough and a tapered valve seat 3 formed transversely of the passageway 2. The bottom or larger end of the tapered valve seat is closed by a cover 4 secured to the casing 1 by means of the cap screws 5. Seated in the valve seat 3 is a tapered plug 6, the smaller end of which is provided with a stem 7, the upper end of which is secured at 8 to accommodate a wrench by which the plug 6 may be turned to open and close the valve. In the upper part of the valve casing 1 is a recess or stuffing box 10 surrounding the valve stem 7 and adapted to contain the packing 9 which is compressed by means of the gland 11, held in place by means of the studs and nuts 12.

The means for lifting the plug 6 from its seat 3 in the casing 1 so that the contacting valve surfaces may be effectively lubricated comprises a lubricant reservoir 14 formed longitudinally in the valve stem 7. The lower end of the reservoir 14 is connected by a transverse hole 15 with a lubricant chamber 16 formed in the upper part of the valve casing. The smaller end of the tapered plug 6 projects into the lubricant chamber. In the larger end of the plug 6 is formed a circumferential groove 17 which is connected with the chamber 16 by the longitudinal lubricating channels 18 and 19 formed in the surface of the plug. Cooperating with the circumferential groove 17 is a corresponding circumferential groove 20 in the adjacent part of the valve casing.

By turning the screw 22 threaded into the upper end of the reservoir 14, the lubricant in the chamber 16, in the vertical grooves 18 and 19, and in the circumferential grooves 17 and 20, is put under pressure which is sufficient to lift the plug 6 from its seat even when it is stuck or badly "frozen" thereto. When the plug 6 has thus been lifted from its seat the lubricant oozes out laterally along the grooves 18 and 19 and also enters the space between the plug and its seat from the chamber 16 and from the circumferential grooves 17 and 20, so that when the plug is turned the contacting valve surfaces are thereby effectively lubricated. A check valve 23 located in the reservoir 14 prevents back-flow of the lubricant from the chamber 16.

The plug 6 is resiliently held against its seat 3 so that it may be lifted therefrom by turning the screw 22 to compress the lubricant in the lubricant spaces. Anti-friction means are provided for cooperating with the means for resiliently holding the plug against its seat so that when the plug is turned the friction between the plug and the holding means may be reduced to a minimum. The anti-friction and resilient plug holding means comprise a ball 25 which is seated in the upper conical part 26 of a recess 27 bored centrally in the circumferential flange 28 depending from the web 29 formed across the lower or larger end of the plug. The ball 25 also seats against the upper end of a conical thrust bearing 30 received within the recess 27. The conical thrust bearing 30 is provided with a plate-like bottom 31 which rests on the center of a metallic disk 32 which is coextensive with the bottom end of the casing and the cover 4 is held in place between the casing and the cover. This disk 32 may be composed of any suitable metal, but is preferably made from a sheet of lead. Interposed between the lead disk 32 and the cover 4 is a disk of resilient material 33 which bears against the inner surface of the cover.

A cushion 35 of resilient material, such as asbestos, is contained in a central hole in the cover opposite the thrust bearing 30. The cushion 35 has substantially the same diameter as the plate-like bottom 31 of the thrust bearing. In the lower end of the hole in the cover 4 which houses the cushion 35 is a threaded plug 36 by which the cushion is compressed to hold the plug 6 resiliently against its seat. By turning the plug 36 the pressure of the plug 6 against the seat is thereby adjusted. Additional means for holding the plug 6 against its seat is provided by boring a hole 37 in the web 29 so as to admit the fluid from the line into the space 38 between the larger end of the plug and the inner surface of the metallic disk 32. The lifting force resulting from turning the screw 22 to put under pressure the lubricant in the chamber 16, in the vertical grooves 18 and 19 and in the circumferential grooves 17 and 20 must be sufficient to overcome not only the pressure exerted against the plug 6 by the cushion 35 but also the pressure exerted against the plug by the fluid in the space 38.

Inasmuch as the resilient pressure exerted by the cushion 35 to hold the plug 6 against its seat is communicated to the plug through the anti-friction bearing 25 seated in the upper end of the cone 30 there is no relative movement between the base 31 of the cone and the center of the metallic disk 32 when the plug is turned to open or close the valve. Hence there is no destructive action on the metallic disk when the valve is manipulated. Thus the metallic disk 32 at all times is an effective seal or guard to prevent corrosive or deteriorating action upon the resilient disk 33 and the resilient cushion 35 by the fluids passing through the line in which the valve is located. The construction and arrangement of the valve parts are such that the gland 11 and plug 36 may be removed so that the packing 9 and cushion 35 may be replaced or renewed while the valve is in operation.

The improved valve described above is particularly adapted for service where plug valves of large size are required. By arranging the lubricant chamber 16 between the smaller end of the plug and the valve casing and by providing the circumferential grooves 17 and 20 or an equivalent construction at the larger end of the plug, the forces which result when the lubricant in these spaces and in the grooves 18 and 19 is put under pressure is sufficient to lift the plug from its seat even when it is badly frozen thereto in plug valves of the largest sizes. By providing means for lubricating the bearing surface between the plug and its seat and by providing an anti-friction bearing between the plug and the cover for holding the plug against its seat friction is reduced to a minimum so that valves of the larger size may be manipulated relatively easily. The interposition of the lead disk 32 between the larger end of the plug 6 and the resilient disk 33 and the cushion of resilient material 35 effectively protects these parts from the corroding and deteriorating action of the fluids passing through the valve. The interposition of the thrust bearing 30 between the ball 25 and the lead disk 32 preserves the lead disk from frictional wear, the thrust bearing 30 remaining stationary while the plug is being turned to either open or closed position.

Having thus described the invention what I claim as new is:—

1. A valve comprising, a casing having a passageway therethrough and a tapered valve seat formed transversely of the passageway, a cover having a central opening secured to the casing for closing the larger end of the valve seat, a resilient disk placed against the inner surface of the cover, a metallic disk interposed between the resilient disk and the casing, a tapered plug seated in the valve seat and having a hole adapted to register with the passageway, an anti-friction bearing between the larger end of the plug and the center of the metallic disk, a cushion of resilient material in the central hole in the cover, and means for compressing the cushion to force the anti-friction bearing against the plug.

2. A valve comprising, a casing having a passageway therethrough and a tapered valve seat formed transversely of the passageway, a cover secured to the casing for closing the larger end of the valve seat, a tapered plug seated in the valve seat and having a hole adapted to register with the passageway, a metallic disk interposed between the cover and the casing, an anti-friction bearing between the larger end of the plug and the metallic disk, and means for resiliently forcing the metallic disk against the anti-friction bearing and the latter against the plug.

3. A valve comprising, a casing having a longitudinal passageway therethrough and a tapered valve seat formed transversely of the passageway, a cover secured to the casing for closing the larger end of the valve seat, a tapered plug seated in the valve seat and having a hole adapted to register with the passageway, a metallic disk interposed between the cover and the casing, a bearing interposed between the larger end of the plug and the metallic disk, a cushion of resilient material located in the cover at a point opposite the bearing, and means for compressing the cushion to hold the bearing against the plug.

4. A valve comprising, a casing having a passageway therethrough and a tapered valve seat formed transversely of the passageway, a cover secured to the casing for closing the larger end of the valve seat, a tapered plug seated in the valve seat and having a hole adapted to register with the passageway, a lubricant chamber in the casing at the smaller end of the plug, a lubricant reservoir, connections between the reservoir and the chamber, means for acting on the lubricant in the reservoir to put the lubricant in the chamber under pressure, cooperating circumferential grooves in the larger end of the plug and in the adjacent part of the casing, longitudinal grooves in the plug connecting the chamber with the circumferential grooves, a resilient disk placed against the inner surface of the cover, a metallic disk interposed between the resilient disk and the casing, said cover having a central hole adapted to receive a cushion of resilient material, a threaded plug for compressing the cushion, a thrust bearing located between the larger end of the plug and the metallic disk opposite the hole in the cover, and a ball interposed between the thrust bearing and the plug.

5. A valve comprising, a casing having a longitudinal passageway therethrough and a tapered valve seat formed transversely of the passageway, a cover secured to the casing for closing the larger end of the valve seat, a metallic disk interposed between the cover and the casing, a tapered plug seated in the valve seat and having a hole adapted to register with the passageway, an anti-friction bearing interposed between the larger end of the plug and the metallic disk, means for resiliently forcing the anti-friction bearing against the plug, and means for lifting the plug from its seat.

6. A valve comprising, a casing having a passageway therethrough and a tapered valve seat formed transversely of the passageway, a cover secured to the casing for closing the larger end of the valve seat, said cover having a central hole, a disk of resilient material placed against the inner surface of the cover, a disk of lead interposed between the resilient disk and the casing, a thrust bearing having a plate-like base placed against the center of the metallic disk, an anti-friction bearing interposed between the thrust bearing and the larger end of the plug, a cushion of resilient material located in the hole in the cover, a threaded plug for compressing the cushion to force the anti-friction bearing against the plug, and lubricating means for lifting the plug from its seat.

SVEN JOHAN NORDSTROM.